Patented Feb. 5, 1935

1,990,453

UNITED STATES PATENT OFFICE 1,990,453

PROCESS AND PRODUCTS RELATING TO IMIDOLS

Walter J. Hund and Ludwig Rosenstein, San Francisco, Calif., assignors to Shell Development Company, San Francisco, Calif., a corporation of Delaware No Drawing. Application October 9, 1933, Serial No. 692,698

20 Claims. (Cl. 260—124)

This invention relates to a process for preparing imido alkylols and more particularly is concerned with their preparation via the reaction of primary or secondary amines which contain at least one mono- or polyhydroxy radical with esters of organic acids, such as the lower and higher fatty acids, whether saturated or unsaturated. Such organic acids may contain substituents as hydroxy (lactic, hydroxy butyric, malic acids), amino groups (anthranilic, amino acetic acids) and the like. Not only aliphatic acid esters, but also the esters of aralkyl acids (as phenylacetic, toluic, benzylmalonic, cinnamic, mandelic, coumaric acids, etc.) and of acids containing heterocyclic (as pyridine, quinoline acids, etc.) as well as carbocyclic nuclei (as benzoic, phthalic, salicylic, hydroxy benzoic, naphthoic acids, etc.) may be employed.

If the ester is of an unsaturated acid containing the group: —CH=CH—CO— or similar reactive group which under the conditions of the reaction may add alkylolamine to saturate the double bond, the resulting ester is an alkylolamine substituted ester which reacts with additional alkylolamine through the ester group in the sense of this invention to produce an imido alkylol of the substituted acid.

In case the free acids are employed, the intermediate product will comprise a salt which, upon dehydration, will yield the desired imido alkylol.

Acyl halides and anhydrides of the above may also be employed.

It will be noted that all the above variations possess a common factor, i. e. the reaction of hydroxyalkylamine, simple or substituted, with an acyl group of the formula

wherein R represents hydrogen, $C_nH_{2n+1}$, $C_nH_{2n-1}$, $C_nH_{2n-3}$, cyclic (hetero- or carbocyclic) nuclei, alkylated cyclic nuclei and their substitution products. With polybasic acids or esters, the acid structure will be somewhat modified, such as with oxalic, malonic, succinic radicals of the formula

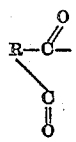

wherein R represents $C_nH_{2n}$ above oxalic acid. In the corresponding mono-unsaturated acids, R would be represented by —$C_nH_n$.

As suitable starting material may be the individual chemical compounds or mixtures thereof or they may be obtained as crude stock from the refining of vegetable oils, animal oils, fats, waxes, resins and the like. Naturally occurring fatty acid glycerides and glycerides of higher molecular weight and naturally occurring saturated and unsaturated fatty or hydroxy fatty acids as well as the corresponding free acids are suitable.

By way of example, only, reference will be had to several examples illustrating the process.

Example I

Oleic acid is mixed with about the stoichiometric amount of monoethanolamine. The resulting soap or salt is distilled at elevated temperatures and reduced pressure. A suitable temperature is above 120° C., the pressure being preferably less than 100 mm. Hg. Actual operation took place at 160° C. at a pressure of 5 to 10 mm. Hg. About 40% of the ethanolamine is converted into ethylol oleic imide. The water formed is distilled off and recovered with the remainder of the ethanolamine. The reaction product is washed with petroleum hydrocarbon solvent or acetone to remove unreacted acid and impurities, the imidoalkylol being comparatively insoluble in these solvents. The residue is recrystallized from hot acetone. The product is a white micro-crystalline solid with a melting point of about 91.0 to 92.2° C. It is soluble in hot alcohol and acetone from which crystals deposit upon cooling. It may be recrystallized from diethyl ether.

Example II

Technical ethylol imide obtained from the total fatty acids of sardine oil is a white micro-crystalline solid, melting point about 91 to 92° C. It is talcy when powdered and fuses into a yellow liquid which sets to a yellow solid with a waxy toughness. Its solubilities are similar to those of ethylol oleic imide.

The alkylolamine extracts obtained from refining crude fatty oils by extraction with alkylolamines are distilled and refined substantially exactly as in Example I.

Example III

The glycerides, representing a sardine oil refined with alkylolamine, are heated to 150° C. and mixed, preferably, with a slight excess over the stoichiometric amount of monoethanolamine. When, after continued heating with agitation, a sample of the reaction mixture shows a drop in ethanolamine content corresponding to the requirements for a complete or substantially complete reaction, the mixture is allowed to cool for water washing, which removes glycerol and unchanged ethanolamine. Any emulsification here may be suppressed by the addition of a small amount of salt. The oily layer is separated from the wash water either before or after solidifying. The crude reaction product is purified by crystallization from hot acetone. Glycerol may be recovered from the wash water. The crystals from the acetone solution are finished free from acetone in a vacuum dryer. The product is well-defined, white, micro-crystalline and practically odorless. It has a melting point of 91–92° C.

Example III discloses a means whereby anhydrous alcohols, whether monohydric or polyhydric, such as glycols and glycerol, may be obtained, especially in the substantially anhydrous state. For example, if the heating is carried out under reduced pressure at a temperature whereat the alcohol distills off, it may be recovered and thus off-set the cost of the alkylolamine consumed.

When imido alkylols being prepared from alkylolamine salts of organic acids, it is desirable to distill the latter at high temperatures and at reduced pressures with limited amounts of steam. The presence of much water reduces the yield of available imido alkylol since it favors the reformation of the alkylolamine.

If desired, one can employ suitable solvents and/or diluents for controlling the temperature of the exothermic reaction, when needed.

The quantity of hydroxyalkylamine used per mol of acyl compound depends on operating conditions and on the character of the acyl compound. For example, with free monobasic acids, one may employ equimolal quantities or higher, whereas with anhydrides and acyl halides, one should resort to stoichiometric amounts which are greater than equimolal quantities in order to obtain substantially complete conversion.

If the ester is one of an unsaturated acid containing the group: —CH=CH—CO— or similar reactive unsaturated group which under the conditions of the reaction adds alkylolamine to saturate the double bond, a different situation presents itself. It is first necessary to add an amount of alkylolamine necessary to saturate the double bond, following which the alkylolamine substituted ester may react with additional alkylolamine to form imido alkylols in the sense of the invention. The group —CH=CH—CO— appears to be the most reactive of unsaturated structures to the addition of alkylolamine to saturate the double bond. However, in the case of unsaturated acids of lower molecular weight having the structural group of —CH=CH—CH₂—CO—, rearrangement readily takes place to the structure —CH₂—CH=CH—CO— which readily adds alkylolamine to saturate the double bond. Therefore, if the beta-gamma olefinic linkage is not sensitive to addition of alkylolamine per se, it will be after such a rearrangement. The sensitivity of the group —CH=CH—CO— to alkylolamine addition appears to drop off with higher molecular weight acids, as for example between acrylic ester and cinnamic ester. Unsaturated acids such as nonylenic and oleic, such as are commonly met with in naturally occurring fatty oil compositions are not sensitive to such addition of alkylolamine to saturate the double bond. With lower free fatty acids containing an alpha-beta or beta-gamma olefine linkage, the alkylolamine will first form the corresponding salt or imido alkylol depending on the operating conditions. If more than sufficient alkylolamine is employed to achieve this result, the excess will tend to saturate the alpha-beta olefine linkage, yielding a preponderant beta alkylolamine addition product.

By way of illustration only, reference has been had in the examples to ethylolamine as a suitable alkylolamine. Not only symmetrical and unsymmetrical, normal and iso alkylolamines as ethanolamine, propanolamine, butanolamine, isobutanolamine, diethylolamine, dipropanolamine, dibutylolamine, ethyl propanolamine and the like can be employed but other appropriate alkylolamines comprise cetylolamine, N-phenyl ethanolamine, N-cyclohexyl butanolamine, etc. thus including aryl- and cyclo-alkyl hydroxyalkylamines as well.

The imido alkylols can be utilized for many purposes. They have a high boiling point; are, in general very stable; and can be obtained directly in the pure state by the present process. They may be used as solvents, plasticizers, fillers, gum solubilizers, fixatives, etc. in the resin, rubber, leather, varnish and allied arts. They may find use as paper sizers, high melting-point candle stock, and leather and rubber dressing compounds. They may be employed as lubricators in greases, as emulsifying agents and as stock material for the manufacture of further organic compounds.

While we have in the foregoing described in some detail the preferred embodiment of our invention and some variants thereof, it will be understood that this is only for the purpose of making the invention more clear and that the invention is not to be regarded as limited to the details of operation described, nor is it dependent upon the soundness or accuracy of the theories which we have advanced as to the reasons for the advantageous results attained. On the other hand, the invention is to be regarded as limited only by the terms of the accompanying claims, in which it is our intention to claim all novelty inherent therein as broadly as is possible in view of the prior art.

We claim as our invention:

1. An imido alkylol wherein at least two carbon atoms separate the imido nitrogen atom from the hydroxyl group of the contiguous alkylol radical.

2. A monoimido alkylol wherein at least two carbon atoms separate the imido nitrogen atom from the hydroxyl group of the contiguous alkylol radical.

3. An imido alkylol wherein two carbon atoms separate the imido nitrogen atom from the hydroxyl group of the contiguous alkylol radical.

4. An imido alkylol of a higher fatty acid wherein at least two carbon atoms separate the imido nitrogen atom from the hydroxyl group of the contiguous alkylol radical.

5. An imido alkylol of an aliphatic carboxylic acid wherein two carbon atoms separate the imido nitrogen atom from the hydroxyl group of the contiguous alkylol radical.

6. A compound of the formula

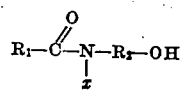

wherein R₁ represents a hydrocarbon radical, R₂ represents a hydrocarbon radical containing at least two carbon atoms in an alkyl chain and $x$ represents hydrogen or an alkylol group.

7. A compound of the formula

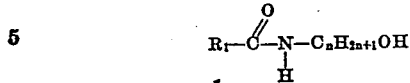

wherein $R_1$ represents a hydrocarbon radical, and $n$ represents an integer having a value equal to at least 2.

8. A compound of the formula

wherein R represents a hydrocarbon radical.

9. An imido alkylol unsaturated in the acyl group wherein at least two carbon atoms separate the imido nitrogen atom from the hydroxyl group of the contiguous alkylol radical.

10. As a composition of matter, a mixture of imido alkylols wherein at least two carbon atoms separate each imido nitrogen atom from the contiguous alkylol group.

11. A process for preparing imido alkylols and other valuable products which comprises reacting a member of the class consisting of carboxylic acids, carboxylic acid anhydrides, carboxylic acid halides and esters of carboxylic acids, with a sufficient amount of an alkylolamine, other than a tertiary alkylolamine, at an elevated temperature to form a substitution product and subsequently recovering an imido alkylol.

12. A process for preparing imido alkylols and other valuable products which comprises reacting a member of the class consisting of carboxylic acids, carboxylic acid anhydrides, carboxylic acid halides, and esters of carboxylic acids, with a sufficient amount of an alkylolamine, other than a tertiary alkylolamine, at an elevated temperature and at subatmospheric pressure to form a substitution product and subsequently recovering an imido alkylol.

13. A process for preparing imido alkylols and other valuable products which comprises reacting a higher carboxylic acid with a sufficient amount of an alkylolamine, other than a tertiary alkylolamine, at a temperature above 120° C. and at subatmospheric pressure to form a substitution product and subsequently recovering an imido alkylol.

14. A process for preparing imido alkylols and other valuable products which comprises reacting an ester of a higher carboxylic acid with a sufficient amount of an alkylolamine, other than a tertiary alkylolamine, at an elevated temperature to form a substitution product and subsequently recovering an imido alkylol.

15. A process for preparing imido alkylols and other valuable products which comprises reacting a carboxylic acid with a sufficient amount of an alkylolamine, other than a tertiary alkylolamine, at an elevated temperature to form a substitution product and subsequently recovering an imido alkylol.

16. A process for preparing imido alkylols and other valuable products which comprises reacting a carboxylic acid with a sufficient amount of an alkylolamine, other than a tertiary alkylolamine, to form the corresponding salt and dehydrating the resulting salt to form an imido alkylol.

17. In the process for preparing imido alkylols, the step of dehydrating a salt of a carboxylic acid with an alkylolamine, other than a tertiary alkylolamine.

18. In the process for preparing imido alkylols, the step of heating a salt of a carboxylic acid with an alkylolamine, other than a tertiary alkylolamine, at an elevated temperature at subatmospheric pressure.

19. In the process for preparing imido alkylols, the step of distilling a salt of a carboxylic acid with an alkylolamine, other than a tertiary alkylolamine, at subatmospheric pressure.

20. In the process for preparing imido alkylols, the step of heating a glyceride with a sufficient amount of an alkylolamine, other than a tertiary alkylolamine until liberation of substantially the combined glycerine is effected.

LUDWIG ROSENSTEIN.
WALTER J. HUND.

DISCLAIMER 1,990,453.—*Walter J. Hund* and *Ludwig Rosenstein*, San Francisco, Calif. PROCESS AND PRODUCTS RELATING TO IMIDOLS. Patent dated February 5, 1935. Disclaimer filed July 22, 1938, by the assignee, *Shell Development Company*.

Hereby disclaims and enters this disclaimer to all of claims 1, 2, 3, 4, 5, 6, 7, 8, 9, 14, 15, 16, and 17 of said Letters Patent.

Also disclaims and enters this disclaimer to as much of claim 11 as is in excess of the following:

A process for preparing imido alkylols and other valuable products which comprises reacting a member of the class consisting of carboxylic acid anhydrides with a sufficient amount of an alkylolamine, other than a tertiary alkylolamine, at an elevated temperature to form a substitution product and subsequently recovering an imido alkylol.

[*Official Gazette August 16, 1938.*]